(12) United States Patent
Hayashi

(10) Patent No.: US 7,086,057 B2
(45) Date of Patent: Aug. 1, 2006

(54) TASK ALLOCATION TIME DECISION APPARATUS AND METHOD OF DECIDING TASK ALLOCATION TIME

(75) Inventor: Kunihiko Hayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 729 days.

(21) Appl. No.: 10/144,747

(22) Filed: May 15, 2002

(65) Prior Publication Data
US 2002/0174164 A1    Nov. 21, 2002

(30) Foreign Application Priority Data
May 17, 2001   (JP)   ............................. 2001-147263

(51) Int. Cl.
*G06F 9/44*    (2006.01)
(52) U.S. Cl. ....................... 718/102; 718/105; 718/107
(58) Field of Classification Search ......... 718/100–108
See application file for complete search history.

(56) References Cited

U.S. PATENT DOCUMENTS

| | | | |
|---|---|---|---|
| 5,379,406 A * | 1/1995 | Wade | ........................... 703/21 |
| 5,465,354 A * | 11/1995 | Hirosawa et al. | ........... 718/106 |
| 5,506,963 A | 4/1996 | Ducateau et al. | |
| 5,628,013 A * | 5/1997 | Anderson et al. | ........... 718/107 |
| 5,812,844 A * | 9/1998 | Jones et al. | .................. 718/104 |
| 5,944,778 A * | 8/1999 | Takeuchi et al. | ............. 718/100 |
| 6,105,048 A * | 8/2000 | He | .............................. 718/100 |
| 6,237,058 B1 * | 5/2001 | Nakagawa | .................. 710/260 |
| 6,434,708 B1 * | 8/2002 | Dunnihoo et al. | .......... 713/502 |

* cited by examiner

*Primary Examiner*—Lewis A. Bullock, Jr.
(74) *Attorney, Agent, or Firm*—Smith Patent Office

(57) ABSTRACT

A task allocation time decision unit inputs a period of each of the tasks and a load factor of each of the tasks with respect to execution time of all tasks from a task context memory unit, and decides the task allocation time. A task occasion frequency computation unit computes a task occasion frequency. An execution time ratio computation unit computes an execution time ratio of each task with respect to a execution time of a certain task. A schedulability condition computation unit computes a conditional expression for enabling scheduling on the basis of the period. A task allocation time decision unit computes a task allocation time for enabling scheduling from the conditional expression and the execution time ratio and outputs the resultant task allocation time to a task allocation time display unit.

14 Claims, 16 Drawing Sheets

FIG. 9A

Input
(Task Context Memory unit)

|  | Period | Load Factor |
|---|---|---|
| Task 1 | 100 | 60% |
| Task 2 | 150 | 30% |
| Task 3 | 350 | 10% |

FIG. 9B

Output
(Task Allocation Time display unit)

|  | Allocation Time |
|---|---|
| Task 1 | 57 |
| Task 2 | 42 |
| Task 3 | 33 |

FIG. 10A

| Scheduling Point | Conditional Expression | Allocation Time of Task 1 |
|---|---|---|
| 100 | C1+C2= C1+0.75C1=100 | C1=57.14 |
| 150 | 2C1+C2=2C1+0.75C1=150 | C1=54.54 |

FIG. 10B

| Scheduling Point | Conditional Expression | Allocation Time of Task 1 |
|---|---|---|
| 100 | C1+ C2+C3= C1+0.75C1+0.583C1=100 | C1=42.85 |
| 150 | 2C1+ C2+C3=2C1+1.50C1+0.583C1=150 | C1=45.00 |
| 200 | 2C1+2C2+C3=2C1+1.50C1+0.583C1=200 | C1=48.97 |
| 300 | 3C1+2C2+C3=3C1+1.50C1+0.583C1=300 | C1=59.01 |
| 350 | 4C1+3C2+C3=4C1+2.25C1+0.583C1=350 | C1=51.21 |

FIG. 13A

Input
(Task Context Memory unit)

|  | Period | Load Factor |
|---|---|---|
| Task 1 | 100 | 60% |
| Task 2 | 150 | 30% |
| Task 3 | 350 | 10% |

FIG. 13B

Output
(Task Allocation Time display unit)

|  | Allocation Time |
|---|---|
| Task 1 | 60 |
| Task 2 | 45 |
| Task 3 | 34 |

FIG. 15A

Input
(Task Context Memory unit)

|        | Period | Load Factor          |
|--------|--------|----------------------|
| Task 1 | 100    | 20 (Allocated Time)  |
| Task 2 | 150    | 60%                  |
| Task 3 | 350    | 40%                  |

FIG. 15B

Output
(Task Allocation Time display unit)

|        | Allocation Time |
|--------|-----------------|
| Task 1 | 20              |
| Task 2 | 67              |
| Task 3 | 105             |

FIG. 16A

| Scheduling Point | Conditional Expression | Allocation Time of Task 2 |
|---|---|---|
| 100 | C1+C2=20+C2=100 | C2=80 |
| 150 | 2C1+C2=40+C2=150 | C2=110 |

FIG. 16B

| Scheduling Point | Conditional Expression | Allocation Time of Task 2 |
|---|---|---|
| 100 | C1+ C2+C3=20+ C2+1.555C2=100 | C2=31.30 |
| 150 | 2C1+ C2+C3=40+ C2+1.555C2=150 | C2=43.04 |
| 200 | 2C1+2C2+C3=40+2C2+1.555C2=200 | C2=45.00 |
| 300 | 3C1+2C2+C3=60+2C2+1.555C2=300 | C2=67.50 |
| 350 | 4C1+3C2+C3=80+3C2+1.555C2=350 | C2=59.26 |

TASK ALLOCATION TIME DECISION APPARATUS AND METHOD OF DECIDING TASK ALLOCATION TIME

BACKGROUND OF THE INVENTION

1. Field of the Invention

The present invention relates to a task allocation time decision apparatus which is used in a software development device and a method thereof. The task allocation time decision apparatus previously computes a task execution time for enabling scheduling on a processor at a time of scheduling a group of given cyclic tasks by a designated scheduling method.

2. Discussion of the Related Art

An embedded system requires precision of results and time constraint. Under such time constraint, each of tasks given to the system must complete its designated processing until the fixed time. The time which should be observed is referred to as deadline. It is important task to schedule such that the deadline of each task is kept when the tasks are executed in parallel. A scheduling with such time constraint is referred to as real time scheduling.

There has been provided an RM (Rate Monotonic) method and an EDF (Earliest Deadline First) method as a representative real time scheduling method. In the RM method, for a group of tasks that are cyclically activated, the shorter period each of them has, the higher priority is set. In the EDF method, the shorter a difference between the deadline and a current time is, the higher the priority is set.

A method of determining whether or not the scheduling is possible so as to keep the deadline at a time of applying a certain scheduling method to a given group of tasks is referred to as decision of ability of scheduling. The decision of ability of scheduling is an important technique in utilizing the real time scheduling at a time of structuring a system.

The longest time from when a task starts to be executed to when the task ends is referred to as worst execution time. Especially in the RM method, it is possible to decide whether or not the scheduling is possible upon the group of tasks by providing a period and the worst execution time of each of tasks.

FIG. 1 shows a conventional scheduling decision device which adopts the above-described method of deciding the ability of scheduling. The scheduling decision device has a task context memory unit 10, a scheduling decision unit 20 and a decision result display unit 30. The task context memory unit 10 stores the information of each of tasks with a group of task programs 11 formed in advance and an execution period 12 of each of the tasks being as an input.

Firstly, a task developer forms a group of tasks in advance, and inputs the group of tasks and the generation period of each of the tasks to the scheduling decision device. An execution time evaluation unit 21 evaluates a worst execution time of each of the tasks. Then, a scheduling evaluation unit 22 decides, on a basis of the worst execution time and the execution period of each of the tasks, whether the scheduling is possible with the designated scheduling method. The decision result display unit 30 informs the task developer of the results of decision.

When the scheduling decision unit 20 decides that the scheduling is impossible, the task developer corrects the group of tasks and optimizes the same, and then the decision is made again at the scheduling decision device. The task developer repeats the above-described process until the scheduling is possible.

When the above-described scheduling decision device is used, the task developer must form in advance a group of tasks and repeat correction and optimization of the tasks, evaluation of the worst execution time and decision of the ability of scheduling until the scheduling is possible. Consequently, in such scheduling decision method, a number of steps is assumed to be increased and whether or not the scheduling is possible cannot be known in an early period of time. Further, according to this scheduling decision method, since a target execution time is not provided at a time of forming tasks and correcting the same, it is difficult for a task developer to decide a method of structuring the tasks or a method of optimizing the same.

SUMMARY OF THE INVENTION

An object of the present invention is to provide a method of deciding task allocation time in which a task allocation time can be decided in advance before forming tasks and a target for forming the tasks can be provided.

Firstly, a task developer inputs constraints for activating a plurality of tasks to be executed and for deadline via an input unit. Then, the task developer inputs a load which is required to a processor with respect to the task via a load input unit. A task allocation time computation unit computes, on a basis of the constraints and the load, a time required for allocating each of the tasks to the processor.

BRIEF DESCRIPTION OF THE DRAWINGS

FIGS. 9A and 9B are operational explanatory views showing the contents of the task context memory unit 100 and results displayed on a task allocation time display unit 140 in the case of selecting the RM method in the embodiment;

FIGS. 10A and 10B are operational explanatory views showing the allocation time of task 1 computed in a task allocation time computation unit 134 in the case of selecting the RM method in the embodiment;

FIGS. 13A and 13B are operational explanatory views showing the contents of the task context memory unit 100 and the results displayed on the task allocation time display unit 140 in the case of selecting the EDF method in the embodiment of the present invention;

FIGS. 15A and 15B are operational explanatory views showing the contents of the task context memory unit 200 and the results displayed on the task allocation time display unit 240 in the case of selecting the RM method and giving the allocated time as inputs of a part of tasks in the embodiment;

FIGS. 16A and 16B are operational explanatory views showing the allocation time of task 2 computed in the task allocation time computation unit 234 in the case of selecting the RM method and giving the allocated time as inputs of a part of tasks in the embodiment.

DESCRIPTION OF THE PREFERRED EMBODIMENTS

First Embodiment

Hereinafter, a task allocation time decision apparatus relating to a first embodiment of the present invention will be described in detail with reference to the drawings. The task allocation time means time which can be allocated to each of tasks when allocating time that each of the task can use a processor to the tasks in accordance with constraints of scheduling given by a user.

[Configuration]

Figure 1:
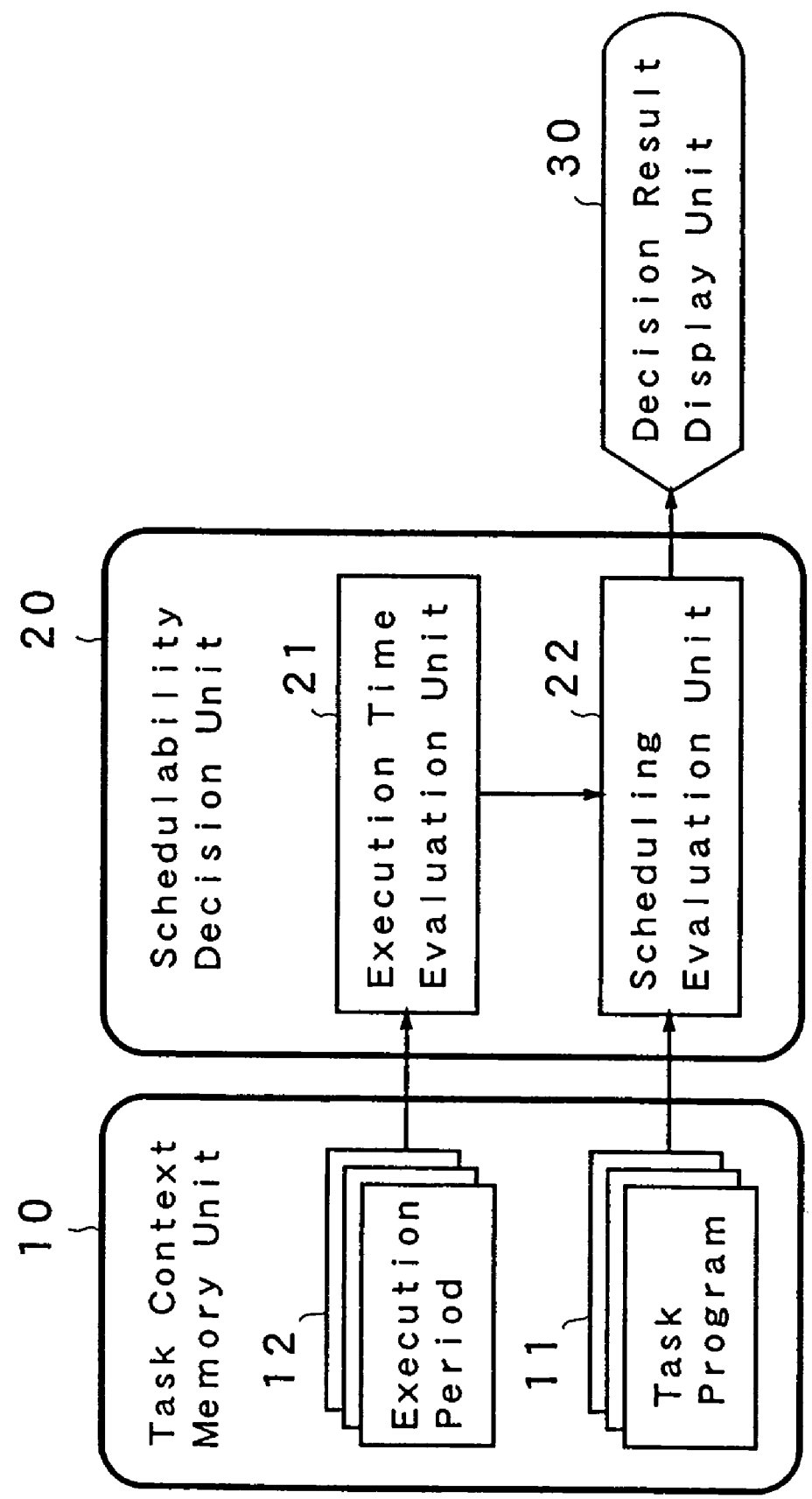
FIG. 1 is a functional block diagram showing a configuration of a conventional task scheduling decision device.
Figure 2:
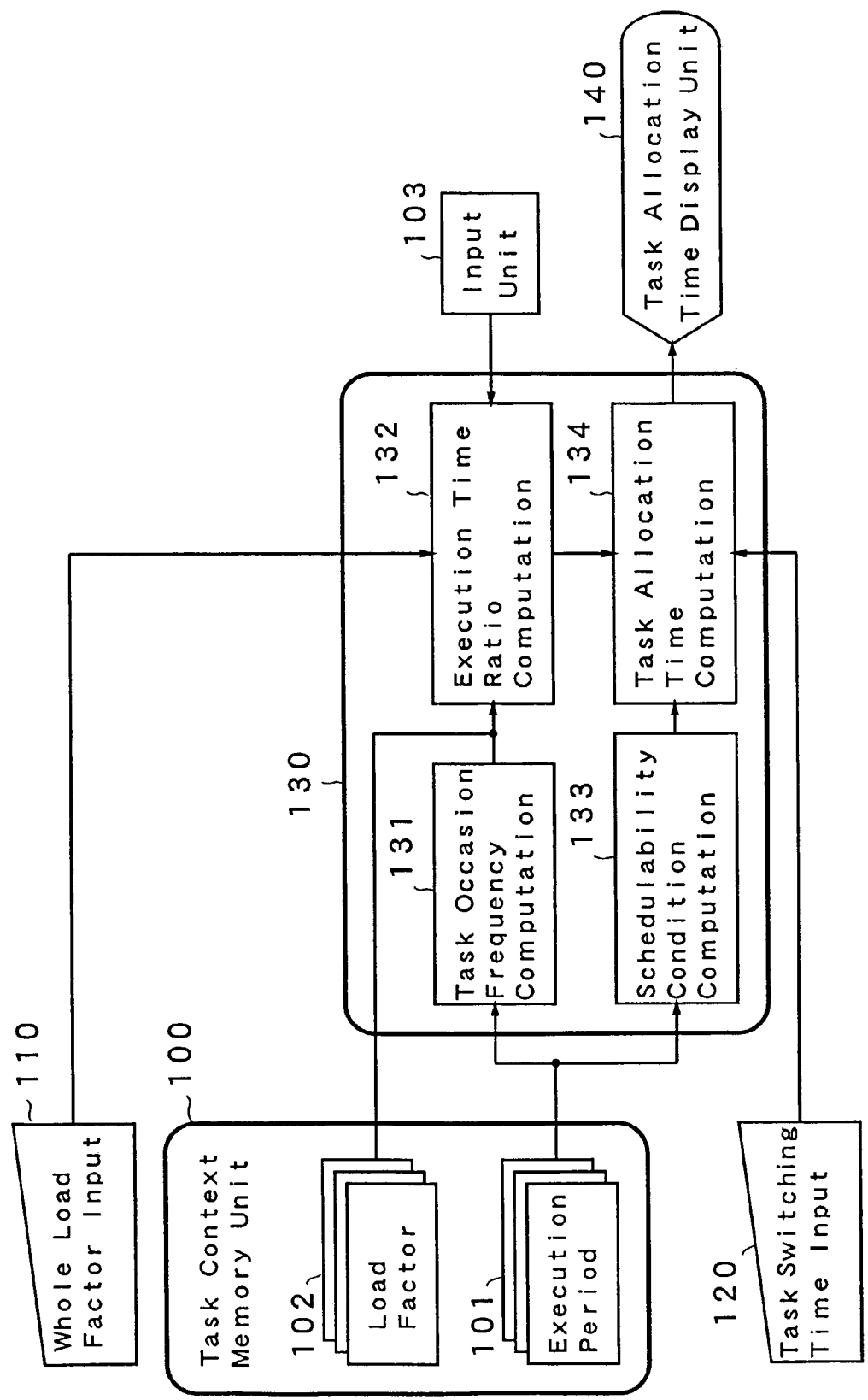
FIG. 2 is a functional block diagram showing a structure of a task allocation time decision apparatus relating to a first embodiment of the present invention.

FIG. 2 is a functional block diagram of a task allocation time decision apparatus of this embodiment of the present invention. The task allocation time decision apparatus includes a task context memory unit 100, an input unit 103, a whole load factor input unit 110, a task switching time input unit 120, a task allocation time decision unit 130 and a task allocation time display unit 140.

Functions of the blocks shown in FIG. 2 will be described. The task context memory unit 100 is a load input unit for inputting the information required for deciding task allocation time, i.e., an execution period 101 and a load factor 102 of each of the tasks, and for storing the same. The input unit 103 is used for inputting constraints about activation and deadline of a plurality of tasks to be executed. The whole load factor input unit 110 is used for inputting a ratio of the time required for executing all tasks to the processor operating time. The task switching time input unit 120 is used for inputting time required for switching of task which occurs at a time of scheduling. The task allocation time decision unit 130 determines the time which can be allocated to each of the task on a basis of the input information read out from the task context memory unit 100.

The task allocation time decision unit 130 is constituted so as to include a task occasion frequency computation unit 131, an execution time ratio computation unit 132, a schedulability condition computation unit 133 and a task allocation time computation unit 134.

The task occasion frequency computation unit 131 computes the number of tasks generated in a certain interval. The execution time ratio computation unit 132 computes a ratio of the execution time of each of the tasks to the execution time of a specific task. The schedulability condition computation unit 133 computes a conditional expression for enabling scheduling. The task allocation time computation unit 134 computes the time which can be allocated to each of the tasks on a basis of the inputted load factor of each of the tasks, the number of tasks generated and the conditional expression for enabling scheduling. The task allocation time display unit 140 displays the computed time which can be allocated to each of the tasks.

[Procedure for Deciding Task Allocation Time]

Next, a procedure for deciding the task allocation time for enabling scheduling will be described. Hereinafter, the period of n tasks is respectively indicated by $T1, T2, \ldots, Tn$. Assume that numbers that numbers for indicating the tasks are sorted in an ascending order of the period. The load factor of the tasks is respectively indicated by $\gamma 1, \gamma 2, \ldots, \gamma n$. A sum total from $\gamma 1$ to $\gamma n$ is a value $\Gamma$ which is inputted from the whole load factor input unit 110. If inputting the value is omitted, $\Gamma$ is 1. $\Gamma$ is a positive number which is equal to or not more than 1. Further, when the total execution time is divided and the divided time is allocated to each of the tasks, the time which can be allocated to the task is respectively indicated by $C1, C2, \ldots, Cn$. These values are an integer.

Firstly, an operation of the task allocation time decision apparatus will be described in a case of selecting an RM method as a scheduling method. The task context memory unit 100 stores the inputted execution period 101 and the load factor 102 of each of the tasks.

Figure 3:
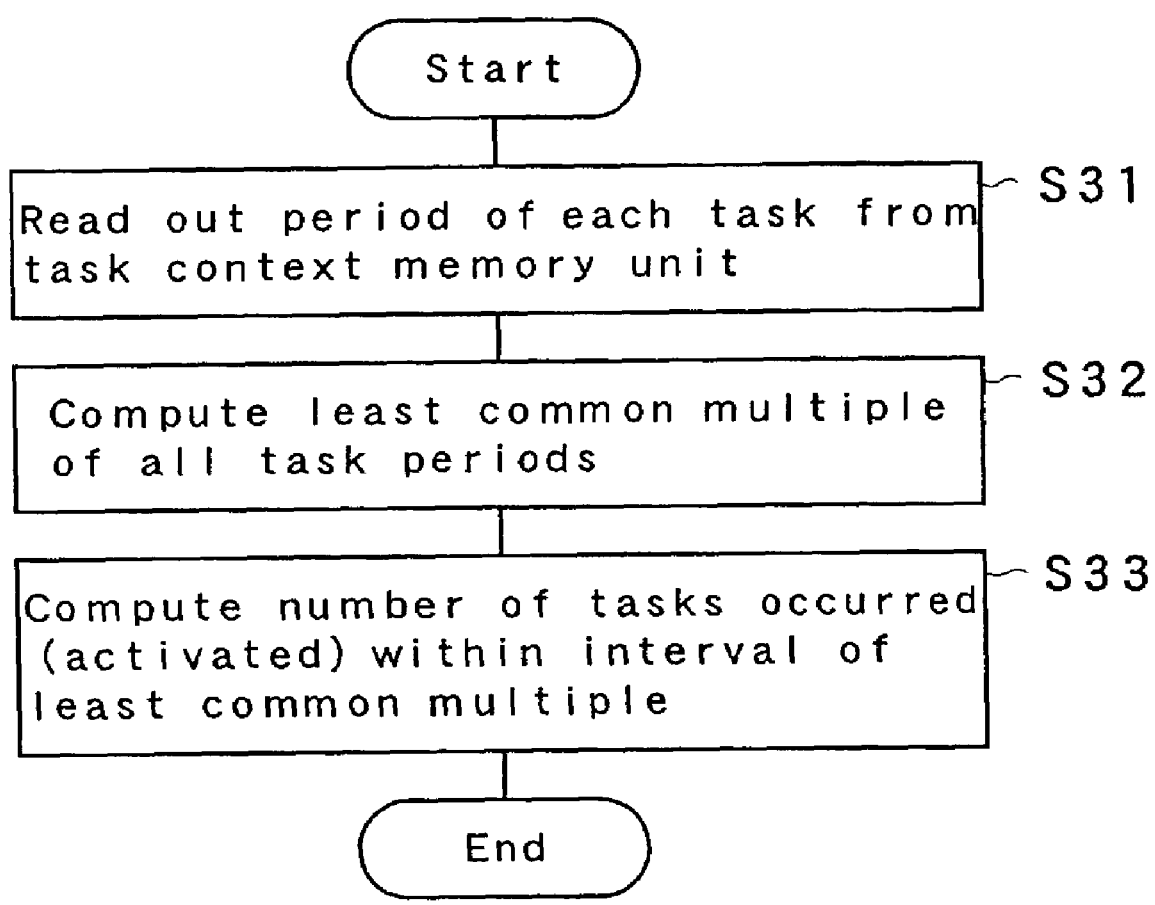
FIG. 3 is a flowchart showing a processing procedure of a task occasion frequency computation unit 131 in a case of selecting an RM method in the embodiment.

The task occasion frequency computation unit 131 carries out the following processing in accordance with a flowchart shown in FIG. 3. Firstly, the execution period of each of the tasks is read out from the task context memory unit 100 (step S31). Then, a least common multiple of the execution periods $T1, T2, \ldots, Tn$ is computed, and the resultant least common multiple is indicated by LCM (T) (step S32).

Assume that the number of tasks i that are generated (activated) from the time 0 to the time LCM (T) is Ni. Then, Ni is computed by using the following formula 1 (step S33).

$$Ni = LCM(T)/Ti \quad (1)$$

Figure 4:
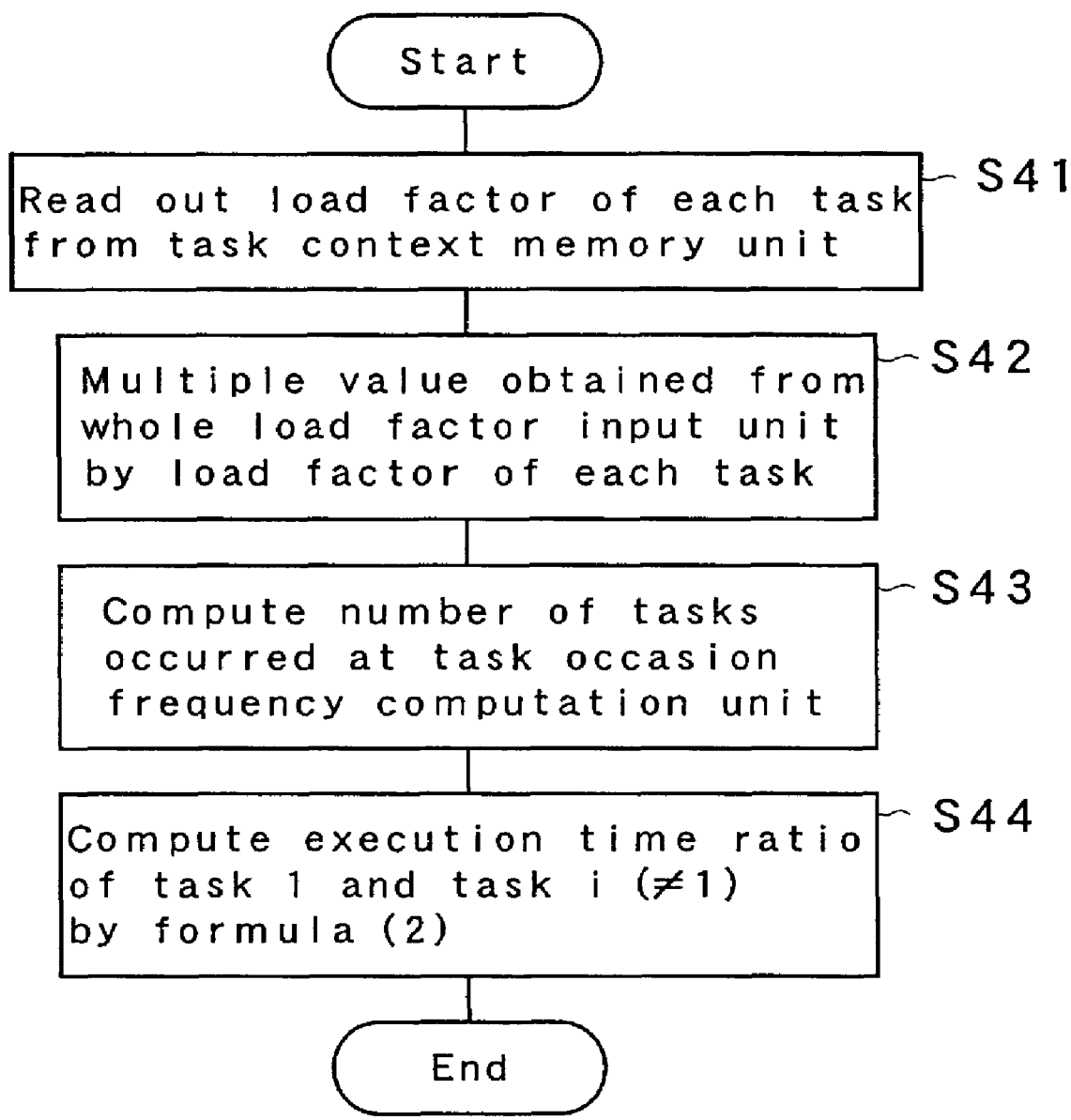
FIG. 4 is a flowchart showing a processing procedure of an execution time ratio computation unit 132 in the case of selecting the RM method in the embodiment.

The execution time ratio computation unit 132 carries out the following processing in accordance with a flowchart shown in FIG. 4. Firstly, the load factor 102 of each of the tasks is read out from the task context memory unit 100 (step S41). The product of each of these load factors and the total load factor r obtained from the whole load factor input unit 110 is $\gamma i$ (step S42). The load factor $\gamma i$ for the task i is a ratio of the time that the task i can be executed to the total time that a CPU can be executed. Thus, the load factor $\gamma i$ is represented by the following formula (2).

$$\gamma i = (Ni \cdot Ci)/\Sigma(Nk \cdot Ck) \quad (k=1, 2, \ldots, n) \quad (2)$$

As $\gamma i$ is known and Ni can be obtained at the task occasion frequency computation unit 131 (step S43), a ratio of the allocation time Ci of the task i (i ≠1) to the allocation time C1 of the task 1 can be computed. Ci can be expressed by C1 (step S44).

Figure 5:
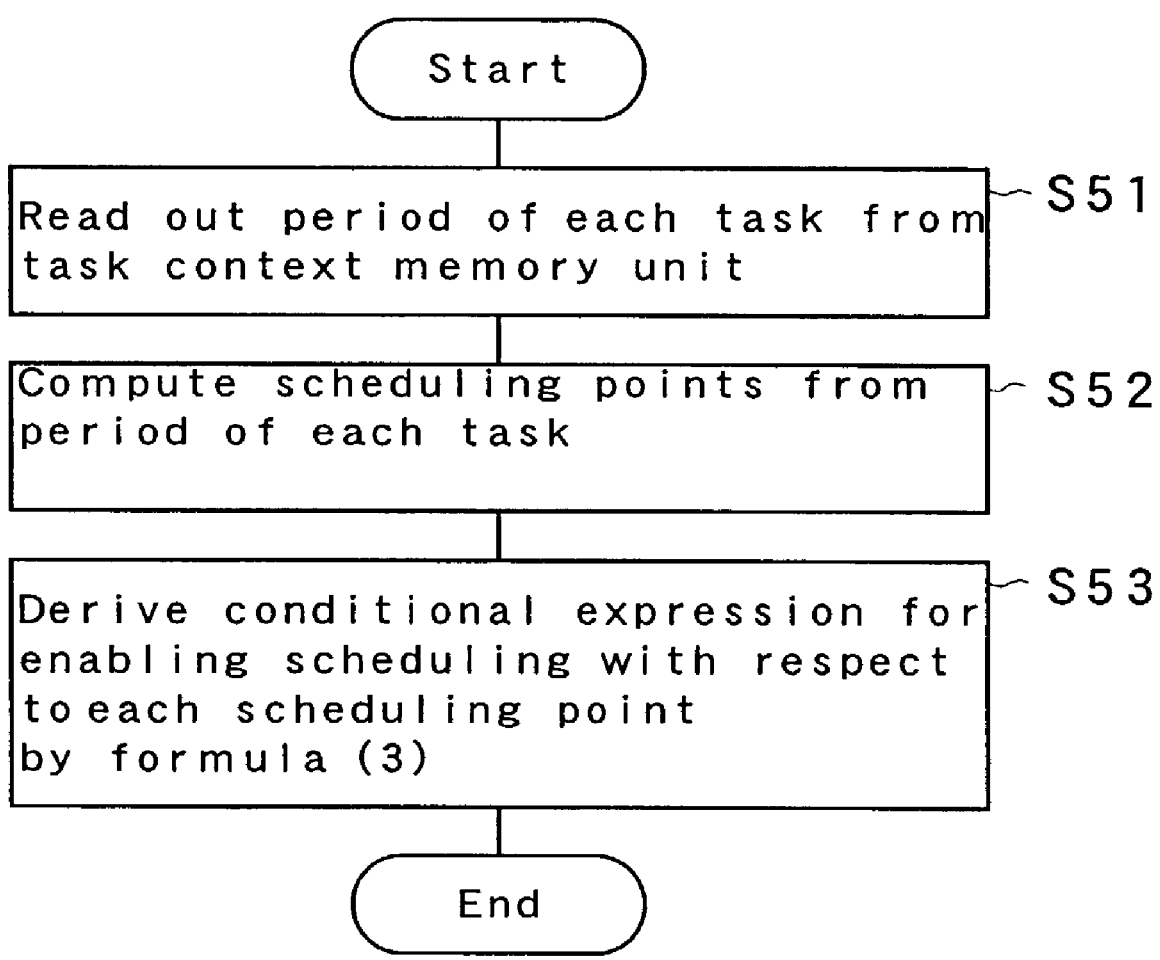
FIG. 5 is a flowchart showing a processing procedure of a schedulability condition computation unit 133 in the case of selecting the RM method in the embodiment.

The schedulability condition computation unit 133 derives a conditional expression in accordance with a flowchart shown in FIG. 5. Necessary and sufficient condition for scheduling in RM method can be expressed by the following inequality.

$$\Sigma \text{ceil}(Sp/Tj)Cj \leq Sp (j=1, 2, \ldots, i) \quad (3)$$

This inequality is a conditional expression for enabling scheduling of i tasks from task 1 to task i. If there are provided n tasks, all of n equalities for i=1, 2, ..., n must be satisfied. Sp is a scheduling point and indicates start time of all tasks generated from the time 0 to the time Ti, i.e., during a maximum task period. For this reason, a plurality of scheduling points exist and inequalities corresponding to the number of scheduling points exist for each i.

Among a plurality of inequalities, only one inequality is satisfied for each i. ceil (X) indicates round-up of X. The left-side of the inequality (3) indicates a sum of times which can be allocated corresponding to the total number of tasks activated with respect to the scheduling point. Accordingly, the inequality shows that if all activated tasks have been executed until the time of the scheduling point, scheduling by the RM method is possible. If an equal sign can be used in this inequality, it suggests that the time for executing the tasks is the longest under the condition that the inequality is satisfied.

Firstly, the schedulability condition computation unit 133 reads out the execution period 101 of each of the tasks from the task context memory unit 100 (step S51). Then, all scheduling points in each of the tasks are computed for each i (step S52). Next, using inequality (3), equations are derived by substituting inequality signs in the inequalities for equal signs (step S53).

Figure 6:
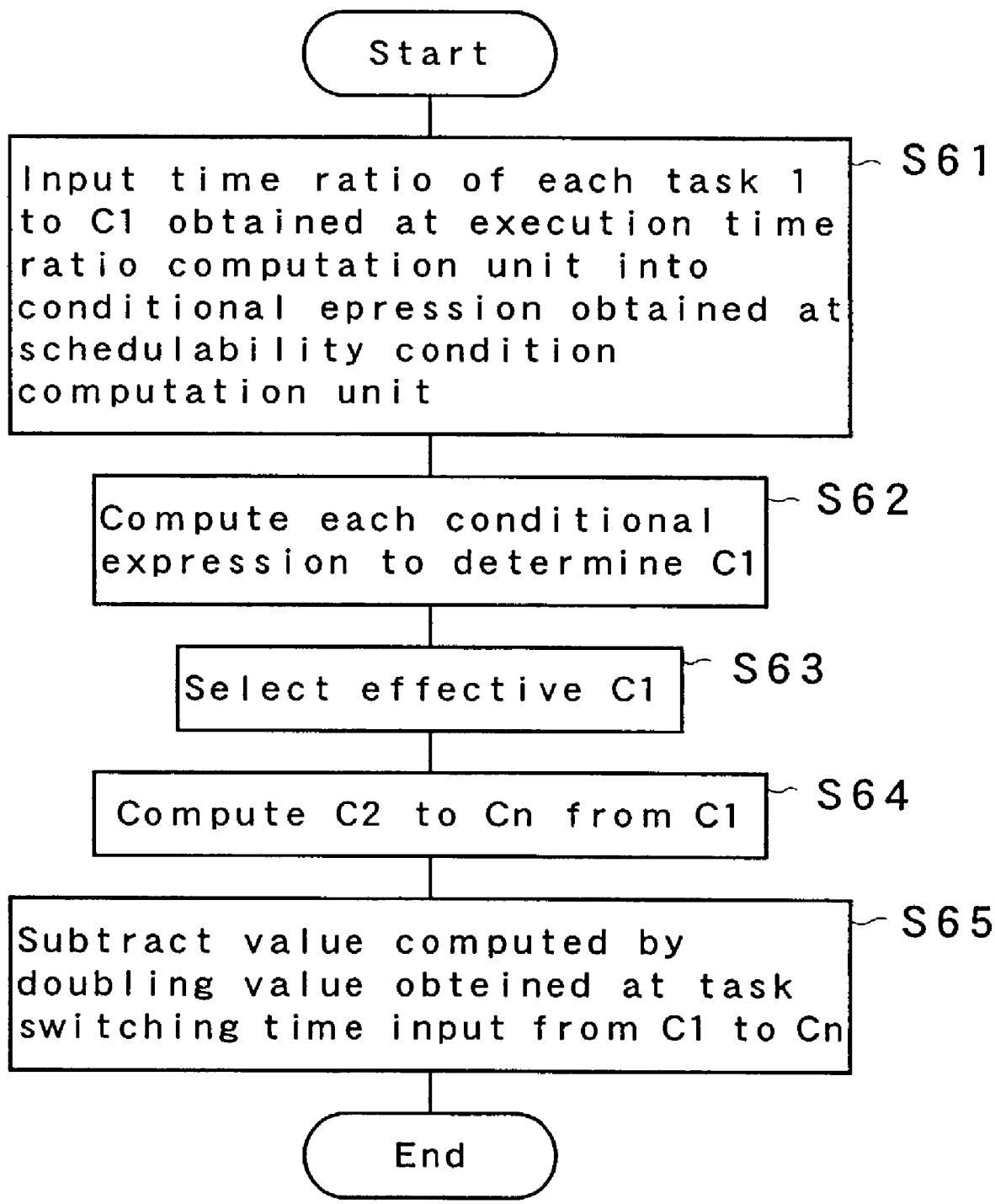
FIG. 6 is a flowchart showing a processing procedure of a task allocation time computation unit 134 in the case of selecting the RM method in the embodiment.

The task allocation time computation unit 134 carries out time allocation for each of the tasks in accordance with a flowchart shown in FIG. 6. The time Ci which can be allocated to the task i is inputted into the conditional expression obtained in the schedulability condition computation unit 133 (step S61). The time Ci which can be allocated to the task i refers to as allocation time of the task i which can be expressed by the allocation time C1 of the task 1 and is obtained in the execution time ratio computation unit 132.

In all of the above-described conditional expressions, only C1 is unknown. Then, C1 is computed from each of the conditional expressions (step S62). As a plurality of scheduling points exist for each i, a plurality of C1s corresponding to the number of scheduling points are computed. The largest C1 is selected from the C1s derived for each i. Since the conditional expressions must be satisfied for all, among the selected n C1s, the smallest C1 satisfies all conditional expressions. Accordingly, the largest C1 is selected for each i and the smallest C1 is selected among the selected C1s such that the final C1 can be obtained (step S63).

As other task allocation time such as C2, C3, . . . , Cn is represented by a ratio with respect to the allocation time C1 of the task 1, C2, C3, . . . , Cn can be computed (step S64).

A case in which the task switching time is inputted from the task switching time input unit 120 will be considered. Assume that the task switching in the RM method occurs only at a time of task activation due to period. Accordingly, a fixed period of time required for switching task is allocated when the task is activated and when the task ends. New allocation time is computed by subtracting two interrupt times for activating and ending the task from the allocation time of each of the tasks. In actuality, the allocation time is computed by subtracting a value obtained by doubling the task switching time from the task allocation time (step S65).

The following shows that the above-described method does not have inconsistencies. Assume that there are provided two tasks, i.e., a task which has high priority and is to interrupt and a task which has low priority and is to be interrupted. The high priority task performs interruption at a time of activation of the high priority task. The low priority task is returned only when the high priority task ends. When this description is applied to all tasks, only the allocation time is considered regardless of the number of interruptions.

The task allocation time display unit 140 displays the allocation time for each of the tasks which is computed in the task allocation time computation unit 134 via a display device.

Next, an operation of the task allocation time decision apparatus will be described in a case of selecting EDF method as a scheduling method. The task context memory unit 100 stores the execution period 101 and the load factor 102 of each of the tasks as inputs.

As the procedure in the RM method, the task occasion frequency computation unit 131 and the execution time ratio computation unit 132 compute a ratio of the allocation time Ci of the task i (i≠1) to the allocation time C1 of the task 1 by using formulae (1) and (2).

Figure 7:
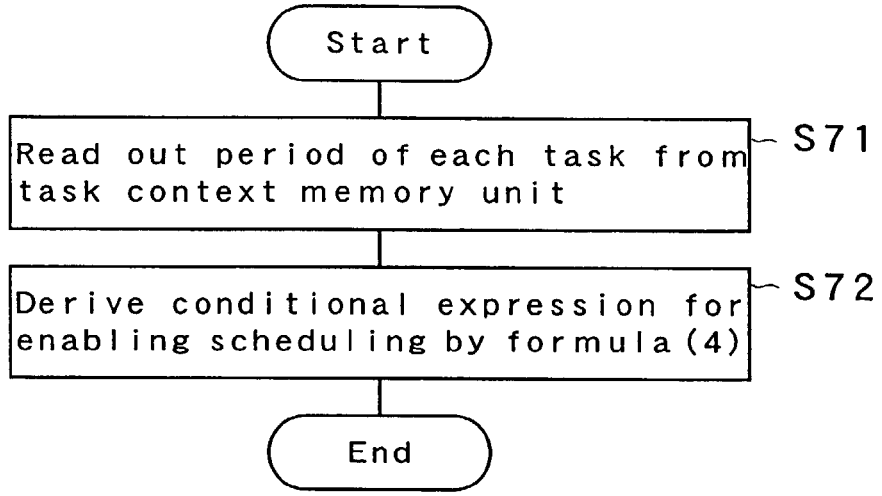
FIG. 7 is a flowchart showing a processing procedure of the schedulability condition computation unit 133 in a case of selecting an EDF method in the embodiment.

The schedulability condition computation unit 133 carries out the following processing in accordance with a flowchart shown in FIG. 7. Necessary and sufficient condition for enabling scheduling can be represented by the following inequality (4).

$$\Sigma(Cj/Tj) \leq 1 (j=1, 2, \ldots, n) \quad (4)$$

This inequality is a conditional expression for enabling scheduling of all tasks. If an equal sign can be used in this inequality, it suggests that the time required for executing the tasks is the longest under the condition that the inequality is satisfied.

Firstly, the task allocation time decision unit 130 reads out the execution period 101 of each of the tasks from the task context memory unit 100 (step S71). Then, equations whose inequality signs are substituted by equal signs are derived by using formula (4) (step S72).

Figure 8:
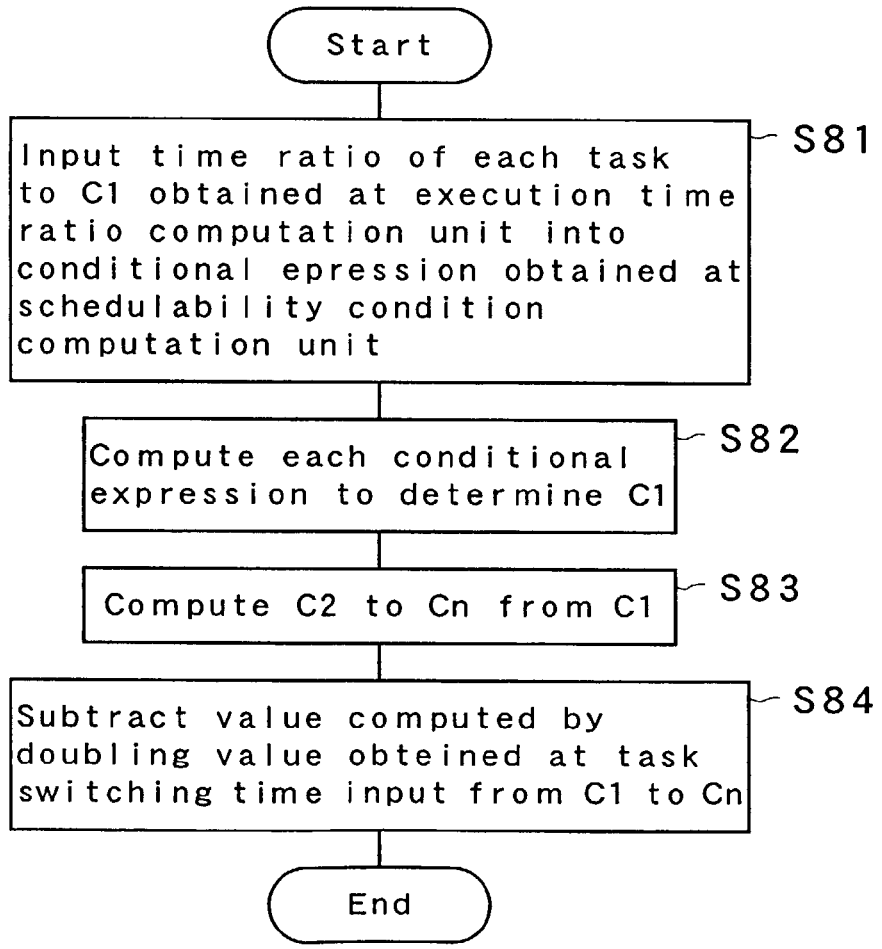
FIG. 8 is a flowchart showing a processing procedure of the task allocation time computation unit 134 in the case of selecting the EDF method in the embodiment.

The task allocation time computation unit 134 allocates time to tasks in accordance with a flowchart shown in FIG. 8. Firstly, the allocation time Ci of the task i which is expressed by the allocation time C1 of the task 1 and is obtained at the execution time ratio computation unit 132 is inputted into each of the conditional expressions obtained at the schedulability condition computation unit 133 (step S81). At this time, in all conditional expressions, only C1 is unknown. Then, C1 is computed from each of the conditional expressions (step S82). C1 can be uniquely determined and thus C2, C3, . . . , Cn are computed (step S83). In the EDF method, the number of task switchings is uniquely determined only at a time of handling cyclic tasks. Accordingly, as the RM method, the allocation time can be determined by subtracting a value computed by doubling the task switching time (step S84).

The task allocation time display unit 140 displays the allocation time of each of the tasks which is computed in the task allocation time computation unit 134 via a display device.

[Operational Example of Task Allocation Time Decision Apparatus]

Hereinafter an operational example of a task allocation time decision apparatus will be described by using a specific example. Firstly, a description will be given of a case of selecting the RM method.

Scheduling of three tasks is considered. Assume that the task context memory unit 100 stores the information shown in FIG. 9A. Namely, a task 1 has a period of 100 and a load factor of 60%, a task 2 has a period of 150 and a load factor of 30%, and a task 3 has a period of 350 and a load factor of 10%.

A least common multiple of the periods is 2100. Thus, for each of the tasks 1, 2 and 3, the number of tasks activated from the time 0 to the time 2100 is 21, 14 and 6, respectively. A ratio of each of the tasks 2 and 3 to the task 1 is computed by using formula (2) such that C2=0.75C1 and C3=0.583C1 can be respectively obtained.

Next, a conditional expression is derived for each i (i=1, 2, 3). When i=1, only one task is provided, and thus C1=100 can be obtained. When i=2, scheduling points are two times, i.e., 100 and 150. The number of tasks activated from the time 0 to the time 100 is respectively one for the task 1 and one for the task 2. The number of tasks activated from the time 0 to the time 150 is two for the task 1 and one for the task 2, respectively. To enable scheduling with the RM method, for each of the scheduling points, a sum of allocation times corresponding to the number of all tasks activated must have been completed until the time of the scheduling point. For this reason, the following formula (5) must be satisfied at the scheduling point 100.

$$1 \times C1 + 1 \times C2 = 100 \quad (5)$$

Because C2 can be expressed by C1, formula (5) can be substituted by the following formula (6).

$$1 \times C1 + 1 \times 0.75 C1 = 1.75 \times C1 = 100 \quad (6)$$

Consequently, C1=57.14 can be obtained as shown in FIG. 10A.

Similarly, when the scheduling point is 150, C1=54.54 can be obtained as shown in FIG. 10A.

When i=3, there are six scheduling points such as 100, 150, 200, 250, 300 and 350. The number of tasks activated from the time 0 to the time 100 is one for the task 1, one for the task 2 and one for the task 3, respectively. Similarly, the number of tasks activated until the scheduling point of the time 150 is two for the task 1, one for the task 2 and one for the task 3, respectively. The number of tasks activated is computed with respect to each scheduling point. Results for these scheduling points computed by the same manner as the case of i=2 are shown in FIG. 10B.

Figure 11:
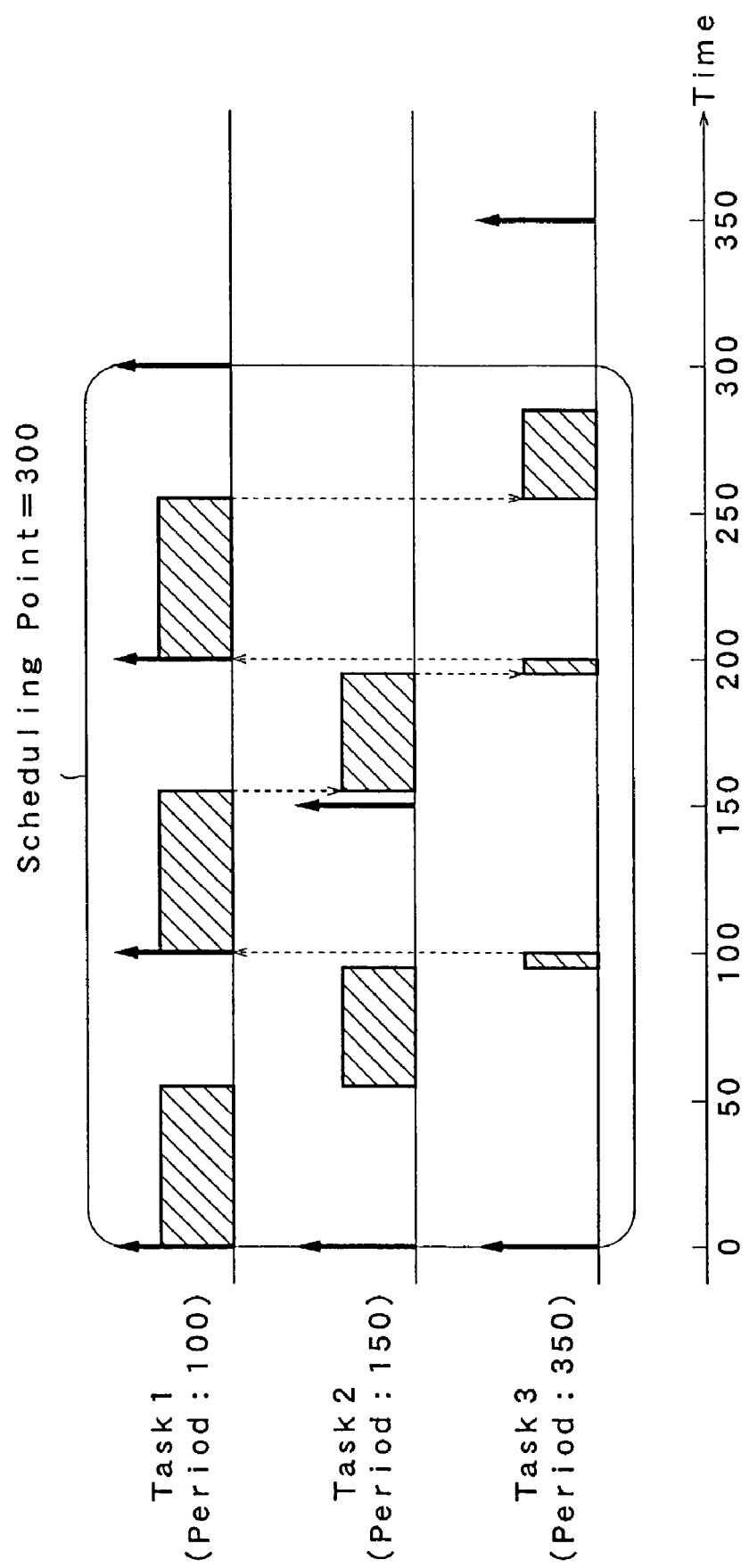
FIG. 11 shows an operational explanatory view showing a case of performing scheduling with the RM method on a basis of the task allocation time obtained in the embodiment.

In accordance with the results, when i=1, C1=100, when i=2, the maximum value is selected and thus C1=57.14, and when i=3, C1=59.01. Among these values, an integer value of C1=57.14 which is the minimum value, i.e., an integer value 57 becomes C1. Similarly, C2=42 and C3=33. These results are shown in FIG. 9B and are displayed on the task allocation time display unit 140. Scheduling which uses such allocation time and applies the RM method is possible. FIG. 11 shows an example of applying the RM method and performing scheduling that such allocation time serves as the execution time of the tasks. This example shows that task scheduling with a computed allocation time being an execution time is possible.

Next, an operational example of the task allocation time decision apparatus in a case of selecting the EDF method will be described. Similar to the above-described example, scheduling of three tasks having task information shown in FIG. 9A is discussed. C2=0.75C1 and C3=0.5831C1 can be obtained from formula (2). The conditional expression can be represented by the following formula (7).

$$C1/T1 + C2/T2 + C3/T3 = 1 \quad (7)$$

When the respective values are inputted into formula (7), the following formula (8) can be obtained.

$$C1/100 + 0.75 C1/150 + 0.583 C1/350 = 1 \quad (8)$$

When computing formula (8), C1=60 can be obtained. Further, C2=45 and C3=34 can be computed. These results are displayed on the task allocation time display unit 140 similar to FIG. 9B. Scheduling which applies the EDF method and uses such allocation time can be carried out.

Figure 12:
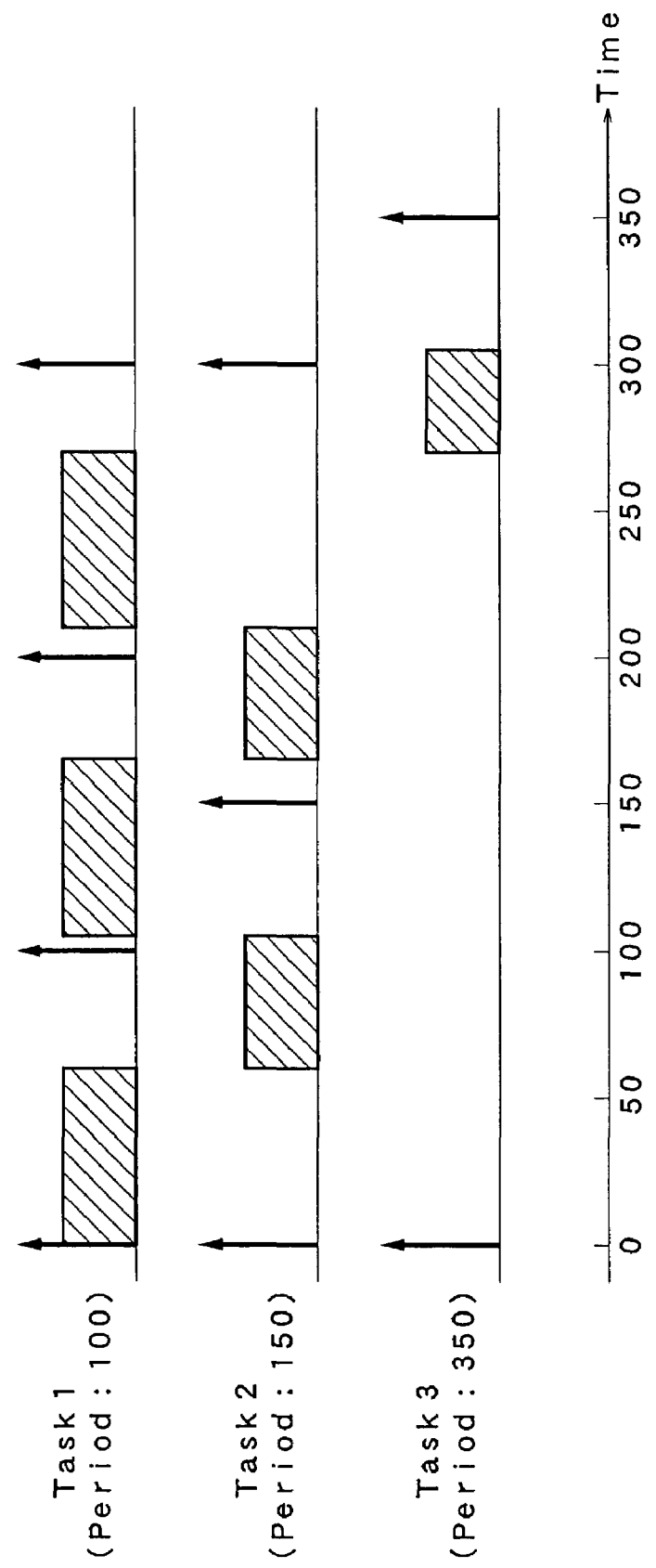
FIG. 12 shows an operational explanatory view showing a case of performing scheduling with the EDF method on a basis of the task allocation time obtained in the embodiment.

FIG. 12 shows an example of applying the EDF method and performing scheduling with the resultant allocation time being the execution time of the tasks. FIG. 13 shows an operational explanatory view showing the contents of the task context memory unit 100 and the results displayed on the task allocation time display unit 140 in a case of the scheduling with the EDF method. These figures show that scheduling of tasks with computed allocation time being the execution time is possible.

Second Embodiment

Figure 14:
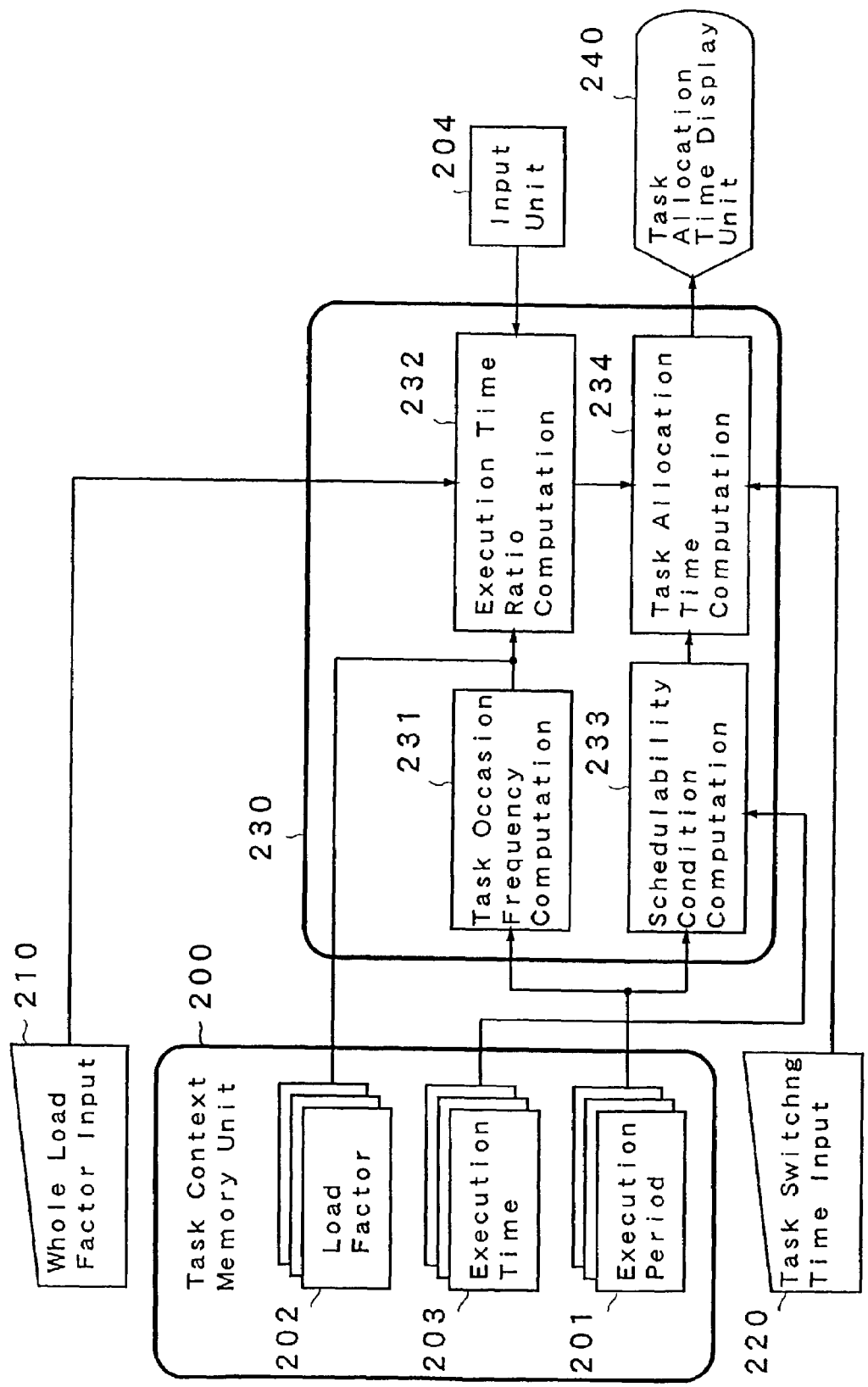
FIG. 14 is a functional block diagram showing a configuration of a task allocation time decision apparatus relating to a second embodiment of the present invention.

Next, a task allocation time decision apparatus relating to the second embodiment of the present invention will be briefly described with reference to the drawings. In the above-described first embodiment, the load factor of each of the tasks is inputted. Several tasks may have known execution time, and the load factor of the remaining tasks may be inputted. FIG. 14 shows a structural view of the task allocation time decision apparatus in such case.

The task allocation time decision apparatus includes a task context memory unit 200, an input unit 204, a whole load factor input unit 210, a task switching time input unit 220, a task allocation time decision unit 230 and a task allocation time display unit 240.

Functions of the blocks shown in FIG. 14 will be described. The task context memory unit 200 is a load input unit for inputting the information required for deciding task allocation time, i.e., an execution period 201 of each of the tasks and a load factor 202 or execution time 203 of the tasks, and for storing the same. The input unit 204 is used for inputting constraints about activation and deadline of a plurality of tasks to be executed. The whole load factor input unit 210 is used for inputting a ratio of the time required for operating all tasks to the processor operating time. The task switching time input unit 220 is used for inputting time required for switching of task which occurs at a time of scheduling. The task allocation time decision unit 230 determines the time which can be allocated to each of the task on a basis of the input information read out from the task context memory unit 200.

The task allocation time decision unit 230 is constituted so as to include a task occasion frequency computation unit 231, an execution time ratio computation unit 232, a schedulability condition computation unit 233 and a task allocation time computation unit 234.

The task occasion frequency computation unit 231 computes the number of tasks generated in a certain interval. The execution time ratio computation unit 232 computes a ratio of the execution time of each of the tasks to the execution time of a specific task. The schedulability condition computation unit 233 computes a conditional expression for enabling scheduling. The task allocation time computation unit 234 computes the time which can be allocated to each of the tasks on a basis of the inputted load factor of each of the tasks, the number of tasks generated and the conditional expression for enabling scheduling. The task allocation time display unit 240 displays the computed time which can be allocated to each of the tasks.

Operations of the blocks of the task allocation time decision apparatus are the same as in the above-described first embodiment except the following description. In this case, formula (2) is applied only to cases in which the execution time is given by the load factor. The allocation time of each of the tasks is indicated by the allocation time of unknown certain task. For tasks having known execution time, in place of the allocation time, the known execution time 203 stored in the task context memory unit 200 is inputted at the schedulability condition computation unit 233.

If an equality is always satisfied at a time of computing the conditional expression (3), the allocation time of each of the tasks is outputted to the task allocation time display unit 240 as described above. If an equality is not satisfied, it is suggested that it is impossible to carry out scheduling and a task developer is informed via a display device that inputted values cannot be applied.

An operation of the task allocation time decision apparatus of the second embodiment will be described by using an specific example. Assume that an RM method is selected as a scheduling method. In order to schedule three tasks, as shown in FIG. 15A, a period of 100 and a known allocation time of 20 for a task 1, a period of 150 and a load factor of 60% for a task 2 and a period of 350 and a load factor of 40% for a task 3 are inputted from the task context memory unit 200.

A least common multiple of the periods is 2,100. For each of the tasks 1, 2 and 3, and the number of tasks activated is 21, 14 and 6, respectively. A ratio of the task 3 to the task 2 is computed by formula (2) and C3=1.555C2 is obtained. Here, the task 1 is excluded because the allocation time is known.

Then, C2 is computed for each i (i=2, 3). When i=2, C2=80 can be obtained by calculation shown in FIG. 16A. When i=3, C2=67.5 can be obtained by calculation shown in FIG. 16B. The minimum value is selected from the computed values and the selected value is made to be an integer. As a result, C2=67 and C3=105 can be obtained. These results are displayed on the task allocation time display unit 240 as shown in FIG. 15B. In this way, scheduling is possible by applying the RM method and utilizing the resultant allocation time.

Figure 17:
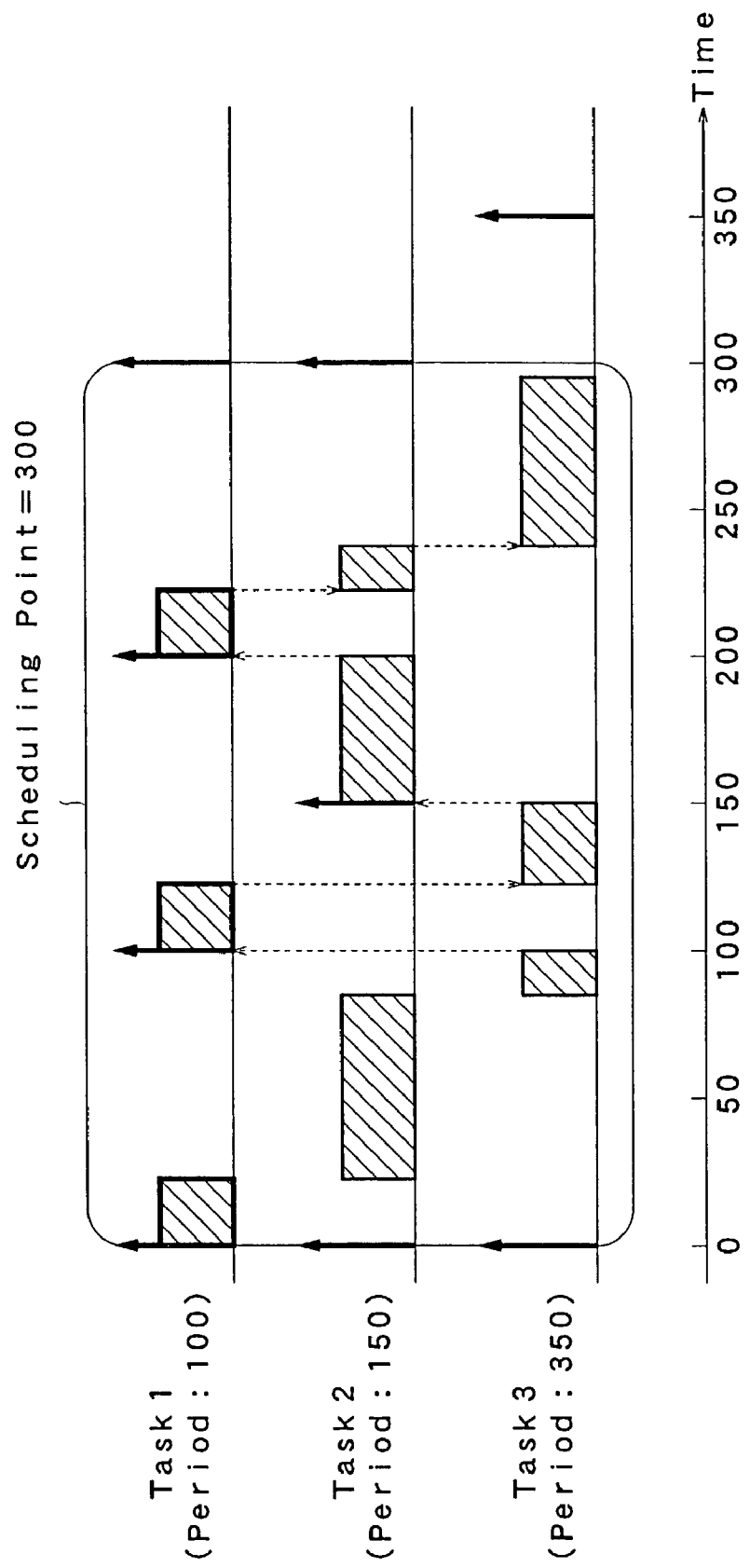
FIG. 17 is an operational explanatory view showing a case of performing scheduling with the RM method on a basis of the resultant task allocation time when the allocated time is given as inputs of a part of the tasks in the embodiment.

FIG. 17 shows an example of applying the RM method and performing scheduling with the allocation time being task execution time. FIG. 17 shows that it is possible to schedule tasks with the computed allocation time being execution time.

As described above, by providing a task period and a load factor for a task allocation time decision apparatus, task allocation time for enabling scheduling can be determined. A task developer can form tasks and optimize the same with the allocation time being a target value. Since scheduling evaluation and task correction cannot be repeated as conventional technique, the number of steps can be significantly reduced.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application No. 2001-147263 filed on May 17, 2001 is hereby incorporated by reference.

What is claimed is:

1. A task allocation time decision apparatus which schedules a group of tasks generated at predetermined periods in accordance with a designated scheduling method, comprising:

an input unit which inputs constraints for activation and a deadline for a plurality of tasks to be executed;

a load input unit which inputs a predetermined execution period for each of said tasks and a load calculated by $\gamma i = (N_i \cdot C_i)/\Sigma N_k \cdot C_k)$ (k=1, 2, ..., n), where $\gamma i$ is a load factor of tasks i, Ci is time which can be respectively allocated to tasks i, and Ni is the number of tasks i that are generated from the time 0 to the time LCM(T), where the LCM(T) is a least common multiple of T1 to Tn representing the execution periods of task 1 to task n, and where Ni is calculated by Ni =LCM(T)/Ti; and a task allocation time decision unit which computes, on the basis of said constraints, said predetermined execution period, and said load, an allocation time for each of the tasks to said processor.

2. The task allocation time decision apparatus according to claim 1, wherein said input unit further designates a method of scheduling tasks, and said task allocation time decision unit produces, on the basis of said constraints, conditions for enabling scheduling with said scheduling method.

3. The task allocation time decision apparatus according to claim 1, wherein said load input unit provides, as an input, a known execution time of a part of said tasks and a ratio of operating time of each remaining task to the total operating time of said processor.

4. The task allocation time decision apparatus according to claim 1, wherein said task allocation time decision unit includes:

a task occasion frequency computation unit which computes, on a basis of said predetermined execution period, the number of tasks generated within the LCM (T); and an execution time ratio computation unit which computes, on a basis of said number of tasks generated and said load, a relationship of said allocation time between tasks.

5. The task allocation time decision apparatus according to claim 1, further comprising:

a task switching time input unit which inputs a task switching time, wherein said task allocation time decision unit computes said allocation time of each of the tasks with the task switching time being excluded.

6. The task allocation time decision apparatus according to claim 1, further comprising:

a whole load factor input unit which inputs a ratio of the execution time of all tasks to operating time, wherein said task allocation time decision unit computes said allocation time of each of the tasks for enabling execution of each task only for the time corresponding to said ratio.

7. The task allocation time decision apparatus according to claim 1, wherein:

a task allocation time decision unit includes:

a task occasion frequency computation unit which computes, on a basis of said predetermined execution period, the number of tasks generated within the LCM (T);

an execution time ratio computation unit which computes a ratio of the execution time of each task to the execution time of a certain task;

a schedulability condition computation unit which computes a conditional expression of the allocation time for enabling scheduling; and a task allocation time computation unit which computes, on the basis of the load factor of each task, said number of tasks generated and the conditional expression for enabling scheduling that serve as inputs, the allocation time of each of the tasks.

8. A task allocation time decision apparatus which schedules a processor with respect to tasks, comprising:

a task context memory unit which stores a predetermined execution period for each of said tasks and a load calculated by $\gamma i=(N_i \cdot C_i)/\Sigma N_k \cdot C_k$ (k=1, 2, ..., n), where $\gamma i$ is a load factor of tasks i, $C_i$ is time which can be respectively allocated to tasks i, and $N_i$ is the number of tasks i that are generated from the time 0 to the time LCM(T), where the LCM(T) is a least common multiple of T1 to Tn representing the execution periods of task 1 to task n, and where $N_i$ is calculated by $N_i = LCM(T)/T_i$; and a whole load factor input unit which inputs a ratio of time for executing all tasks to operating time of said processor;

a task switching time input unit which inputs time required for switching of tasks occurred at scheduling;

a task allocation time decision unit which decides, on the basis of the inputted information, an allocation time of each of the tasks; and a task allocation time display unit which displays said allocation time, wherein said allocation time decision unit includes:

a task occasion frequency computation unit which computes the number of tasks generated within the LCM (T);

an execution time ratio computation unit which computes a ratio of the execution time of each task to the execution time of a certain task;

a schedulability condition computation unit which computes a conditional expression of said allocation time for enabling scheduling; and a task allocation time computation unit which computes, on the basis of the load factor of each task, said number of tasks generated and the conditional expression for enabling scheduling that serve as inputs, the allocation time of each of the tasks.

9. A computerized method of deciding task allocation time which schedules a group of tasks generated at predetermined periods in accordance with a designated scheduling method, comprising the steps of:

inputting constraints for activation and a deadline for a plurality of tasks to be executed;

inputting a predetermined execution period for each of the tasks and a load calculated by $\gamma i=(N_i \cdot C_i)/\Sigma N_k \cdot C_k$ (k=1, 2, ..., n), where $\gamma i$ is a load factor of tasks i, $C_i$ is time which can be respectively allocated to tasks i, and $N_i$ is the number of tasks i that are generated from the time 0 to the time LCM(T), where the LCM(T) is a least common multiple of T1 to Tn representing the execution periods of task 1 to task n, and where $N_i$ is calculated by $N_i=LCM(T)/T_i$; and computing, on the basis of the constraints, the execution period, and the load, an allocation time for each of the tasks to the processor.

10. The computerized method of deciding task allocation time according to claim 9, further comprising:

a step of designating a scheduling method of the tasks, wherein said step of computing the task allocation time produces, on the basis of the constraints, conditions for enabling scheduling with said scheduling method.

11. The computerized method of deciding task allocation time according to claim 9, wherein said step of inputting the load provides, as an input, known execution time of a part of the tasks and a ratio of the executing time of remaining tasks to the operating time of the processor.

12. The computerized method of deciding task allocation time according to claim 9, wherein said step of computing the task allocation time further comprises the steps of:

computing, on the basis of the predetermined execution period, the number of tasks generated within the LCM (T); and computing, on the basis of the number of tasks generated and the load, a relationship of the allocation time between the tasks.

13. The computerized method of deciding task allocation time according to claim 9, further comprising the steps of inputting a task switching time, and computing the allocation time of each of the tasks with the task switching time being excluded.

14. The computerized method of deciding task allocation time according to claim 9, further comprising:

a step of inputting a ratio of the execution time of all tasks to operating time, and a step of computing the allocation time of each of the tasks for enabling execution of each task only for the time corresponding to the ratio of the operating time.

* * * * *